(Model.)
J. W. DAY.
KNOB ATTACHMENT.
No. 349,483. Patented Sept. 21, 1886.
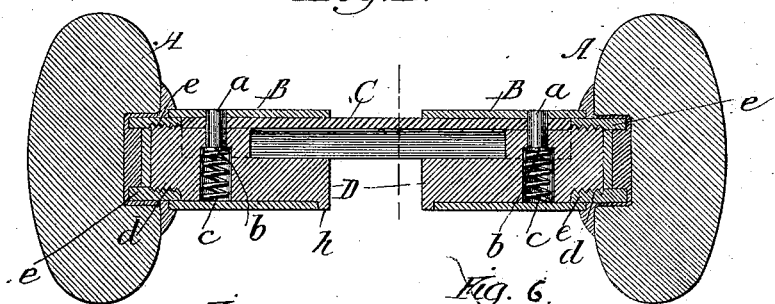
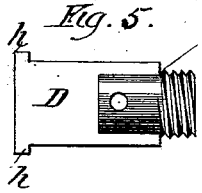
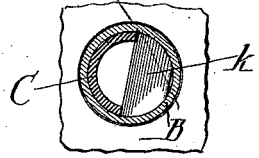
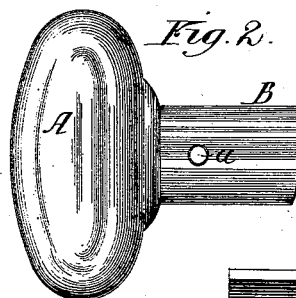
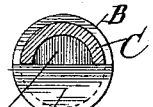
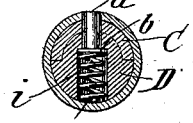
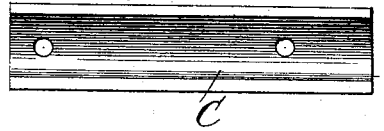
Witnesses:
Frank S. Blanchard
Howard Hallock
Inventor:
John W. Day
By A. M. Stout
Attorney

UNITED STATES PATENT OFFICE.

JOHN W. DAY, OF CHICAGO, ILLINOIS.

KNOB ATTACHMENT.

SPECIFICATION forming part of Letters Patent No. 349,483, dated September 21, 1886.

Application filed June 16, 1886. Serial No. 205,375. (Model.)

*To all whom it may concern:*

Be it known that I, JOHN W. DAY, of Chicago, in the county of Cook and State of Illinois, have invented certain Improvements in Knob Attachments, of which the following is a specification.

My said invention will be hereinafter fully described, with reference to the accompanying drawings, in which—

Figure 1 represents a central vertical section of two door-knobs and two shanks and of the spindle on which they are mounted, showing the construction of the spindle and the devices by which the shanks of the knobs are fastened thereto; Fig. 2, a plan of one of the knobs and a portion of a sleeve, B, in position on a shank, D; Fig. 3, an end view of a shank and cross-section of a sleeve in position thereon; Fig. 4, a transverse section of a sleeve, spindle, and shank taken down through the spring-chamber $i$, the said parts being in proper position; and Figs. 5, 6, and 7, detail views of parts.

In the drawings, A indicates the knobs, and $e$ the tubes, which are inserted into and fastened in them in any suitable manner, and are provided at their inner ends with female screw-threads. D indicates the shanks, whose outer ends are provided with exterior screw-threads to correspond with the threads in the tubes $e$, in order that the shanks may be screwed into the knobs and thus fastened therein. The upper portions of the inner ends of the shanks are reduced or cut away in order to provide suitable spaces between said shanks and the sleeves B, when the latter shall have been placed upon and around the shanks and abutting against the knobs with their outer ends, as shown in Figs. 1 and 2, for the outer end of the spindle C to enter in order to be operated by the knobs.

The spindle C, a detail view of which is shown in Fig. 7, may be made of any suitable metal, and of suitable length to pass through a door into one or more holes in each end, properly located for the insertion of the pin $a$ through it and the holes in the sleeve B and those in shank D, in order to attach these parts together in position for use. The form of the spindle is preferably that of a longitudinal section of a hollow cylinder, and it occupies the position in respect to the shanks and sleeves as shown in Fig. 1.

In Fig. 6 is shown the part $k$, which is connected with the latch or bolt of the lock, upon which the spindle is made to operate directly by turning the knobs, the two side edges of the spindle fitting snugly upon said part $k$, so that according to the direction in which one of the knobs may be turned, one edge or the other will exert the required force upon the lock with more or less of leverage, according to the distance across between the two side edges. The inner ends of the shanks are provided with flat upper surfaces and with semicircular flanges $h$, as shown, said flanges being of larger diameter than the bodies of said shanks, so that the flanges will extend out flush with the outer surfaces of the sleeves B, which, when in position, are mounted upon the shanks between the knobs and the flanges $h$, the sleeves being provided with square shoulders to abut against the flanges, which prevent said sleeves from revolving on the shanks, while the flanges and knobs prevent endwise motion thereof. It results from the construction and arrangement of parts above specified that a knob, shank, and sleeve become practically one part or piece when connected by the pin $a$. Now, in order to easily attach to and detach from the ends of the spindle the said parts so made up, each shank is provided in its interior with a spring-chamber, $i$, extending up from its lower side half-way through it or more, and large enough to secure a sufficiently strong spiral spring, $c$, and pin $a$, having a head or flange, $b$, which rests upon the top end of the spring and extends up through the shank, the spindle, and sleeve, each of said parts being provided with suitable holes properly located, the pin being kept up in position by the tension of the spring placed in the spring-chamber.

Whenever it may be desired to take off the knobs, it will only be necessary, by means of some small pointed instrument, to force the point of the pin downward out of the holes in the sleeves and spindle and then pull off the knobs; but when the latter are off the pins are pushed down and the knobs forced on, and then held there by the spring-pins.

What I claim as my invention, and desire to secure by Letters Patent, is—

The combination, with the shank D, suitably attached to a knob, and provided on its inner end with a flange, $h$, and in its interior with a spring-chamber, a spring seated therein, and a pin, $a$, acted upon by the spring, of the spindle C, provided with suitable holes for the pin to pass through, and the sleeve B, also provided with holes for the pin, and abutting at one end against the knob, and at the other provided with shoulders to engage the flange $h$ on the shank, substantially as and for the purpose set forth.

JOHN W. DAY.

Witnesses:
 FRANK P. CONGER,
 GEO. R. CHISELIN.